Sept. 5, 1967 B. T. SMITH ET AL 3,339,884
ADJUSTABLE BALL VALVE APPARATUS
Filed April 8, 1964 6 Sheets-Sheet 3

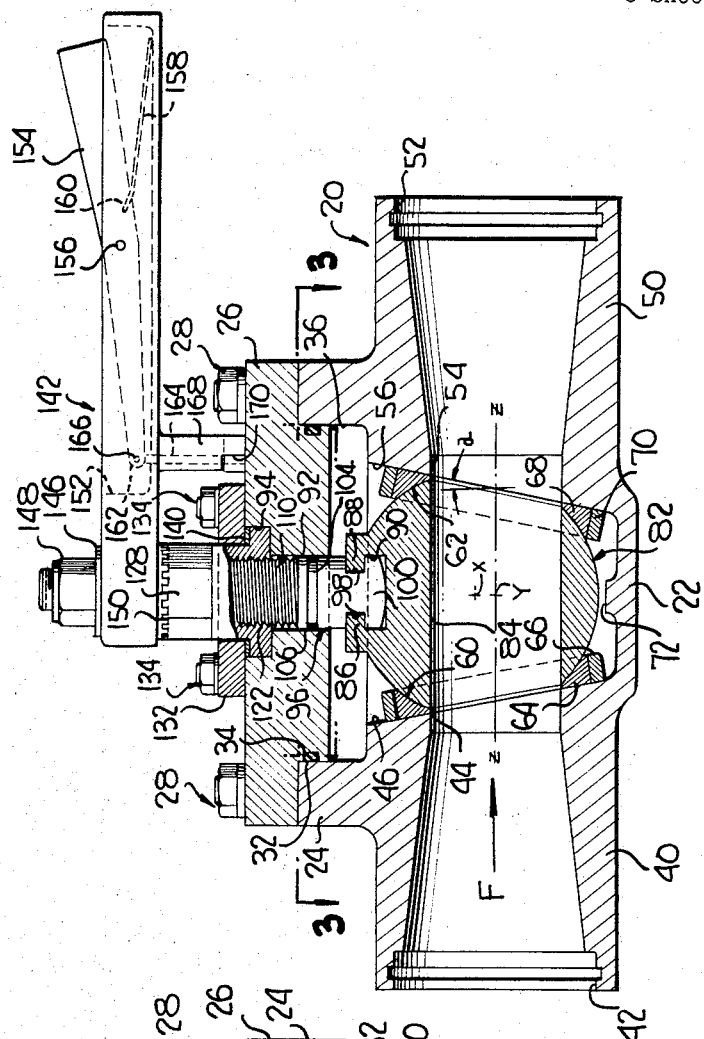

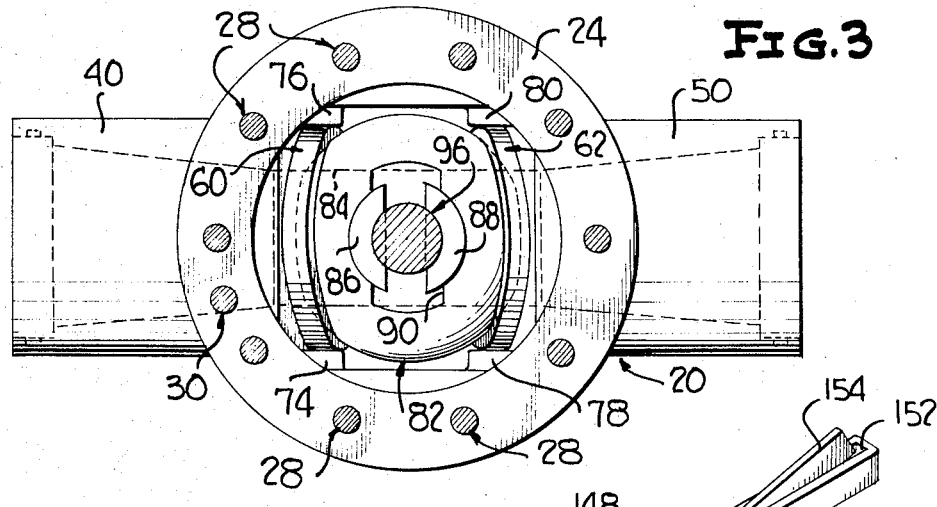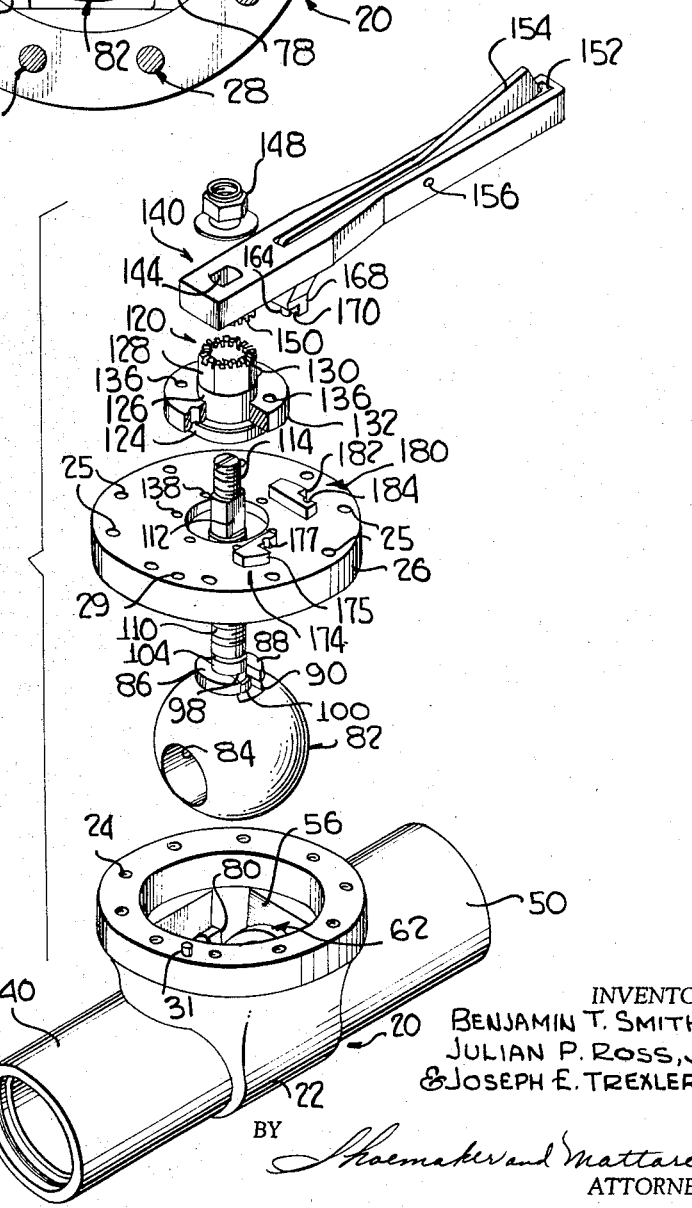

INVENTORS
BENJAMIN T. SMITH,
JULIAN P. ROSS, Jr.
& JOSEPH E. TREXLER, Jr.
BY Shoemaker and Mattare
ATTORNEYS Sept. 5, 1967 B. T. SMITH ET AL 3,339,884
ADJUSTABLE BALL VALVE APPARATUS
Filed April 8, 1964 6 Sheets-Sheet 4
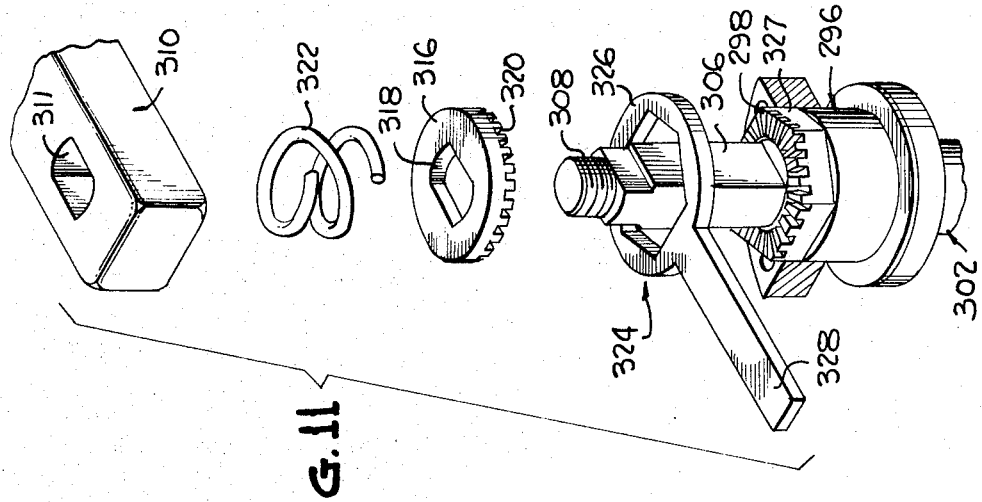
Fig. 11
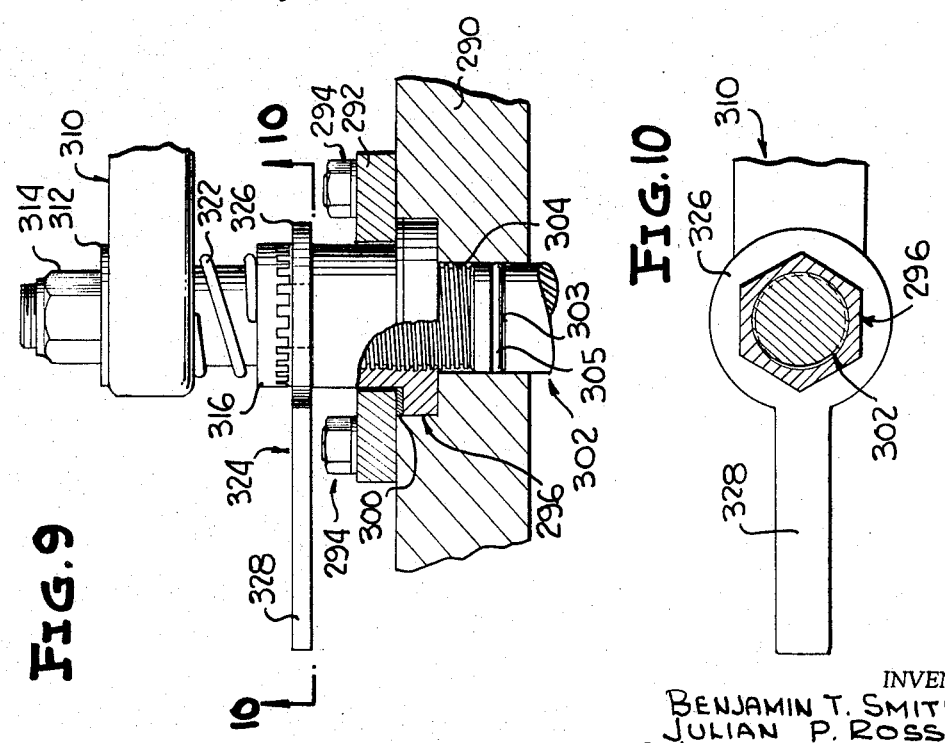
Fig. 9
Fig. 10
INVENTORS
BENJAMIN T. SMITH,
JULIAN P. ROSS, Jr.
& JOSEPH E. TREXLER, Jr.
BY Shoemaker and Mattare
ATTORNEYS

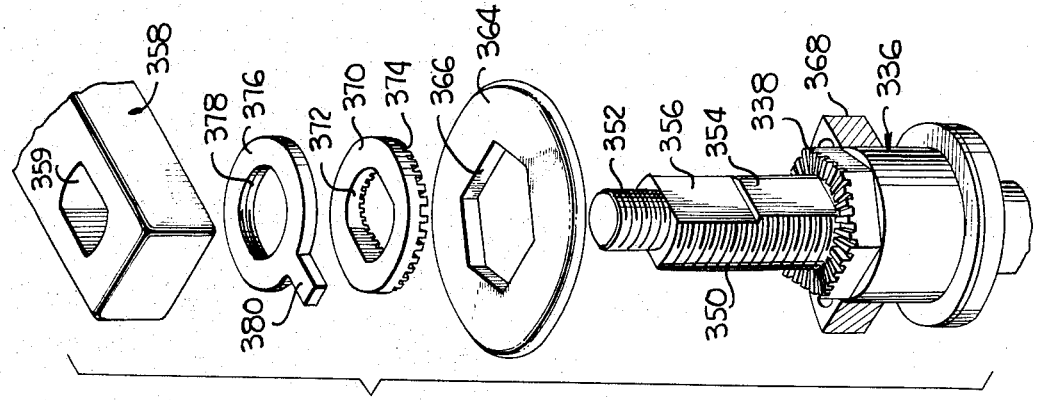
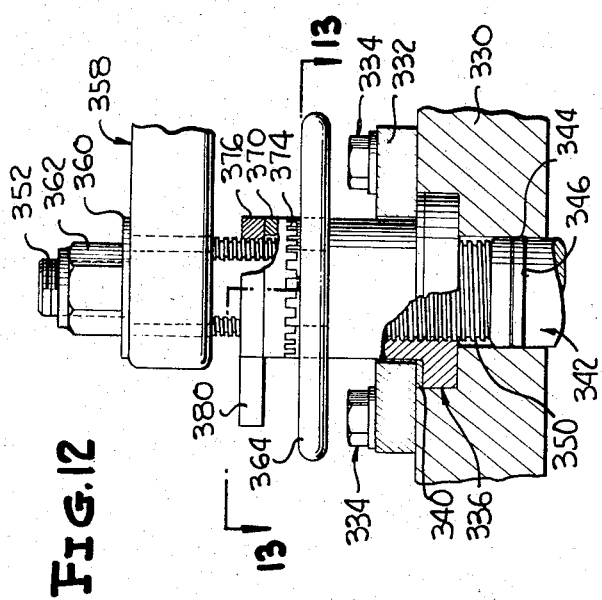
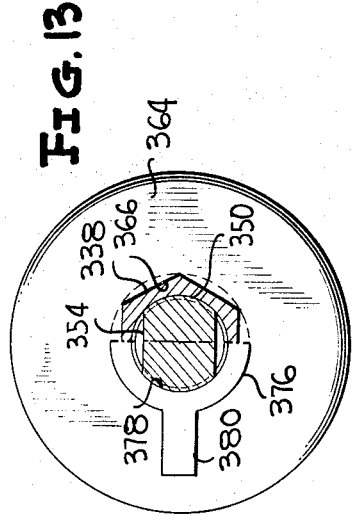

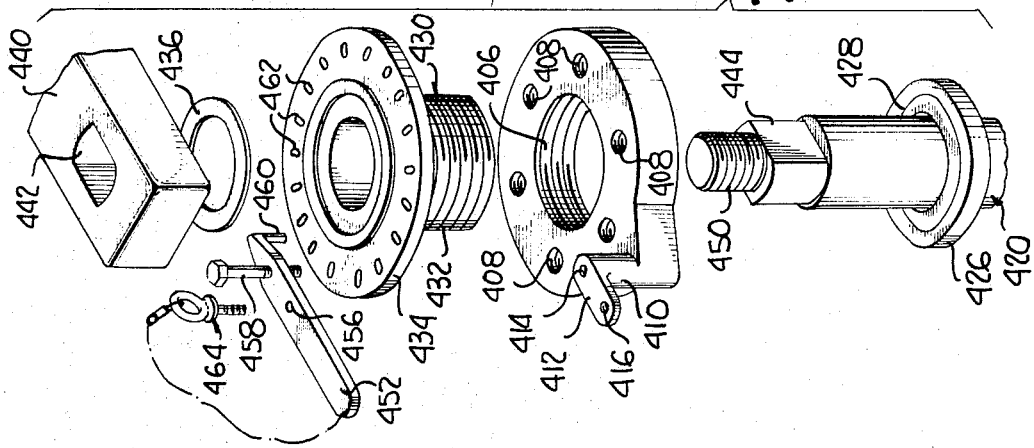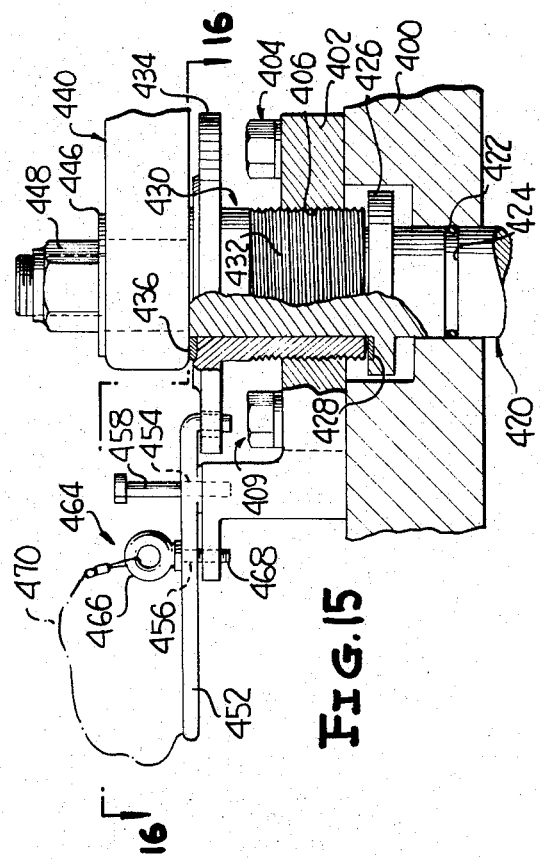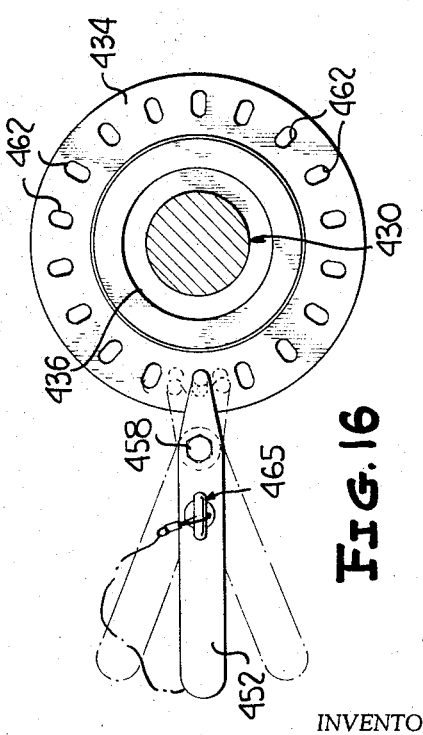

3,339,884
ADJUSTABLE BALL VALVE APPARATUS
Benjamin T. Smith and Julian P. Ross, Jr., Newport News, and Joseph E. Trexler, Jr., Hampton, Va., assignors to Newport News Shipbuilding and Dry Dock Company, Newport News, Va., a corporation of Virginia
Filed Apr. 8, 1964, Ser. No. 358,358
11 Claims. (Cl. 251—161)

The present invention relates to new and novel adjustable ball valve apparatus, and more particularly to valve apparatus of this type which may be externally adjusted while the associated fluid pressure system is in operation.

The present invention is directed to the type of valve apparatus wherein a ball member having an outer surface defining a portion of a spherical surface is adapted to be turned between open and closed positions, the ball valve portion having a bore formed therethrough which can be aligned with the inlet and outlet openings formed in the valve body.

This type of ball valve portion cooperates with a pair of seats which are generally annular in configuration and which are adapted to seal against the outer surface of the ball valve portion to provide an effective fluid tight seal during operation.

Ball valves have presented many problems in service in the past, and it is a particular objective of the present invention to eliminate or minimize these problems. For example, when a ball valve is used in water service, the seats generally absorb moisture and swell thereby causing the valve to stick. On the other hand, when the ball valve is used in dry surfaces such as in an air pressure system, the seats lose moisture and shrink, thereby causing the valve to leak. Prior art efforts to modify the ball valve or the seats in an effort to overcome such problems have produced non-standard parts which result in costly replacements.

The ball valve apparatus of the present invention is adjustable from an external portion of the valve body and permits adjustment so as to correct for a leaking valve due to worn seats, slightly scored seats, dried out seats or other reasons. This external adjustment feature also allows for correction of stuck or seized valves due to seat swelling, obstructions or other reasons.

With the arrangement of the present invention, scored seats or slightly corroded ball valve portions can be dressed and returned to service, whereas this procedure was not possible with prior art structures. The adjustment feature also allows for variation in stack height and machining tolerances in the valve body as well as small distortions of the valve body due to welding of the valve to the line or other similar causes.

In the past, it has been generally found that the best materials for the seats for most considerations have bad swelling characteristics. The arrangement of the present invention eliminates the consideration of swelling as a factor in material selection since such swelling can be compensated for by adjustment of the valve thereby permitting the best seating materials available to be utilized with the structure as disclosed herein.

In addition, a stuck or seized valve with the arrangement of the present invention can be adjusted without disassembling the valve or removing it from the line. The seized ball valve portion can be broken loose and the valve adjusted while the valve is in use, thus preventing costly removal expense and down time. This type of ball valve structure will result in substantial savings where utilized on shipboard for example as used in submarines and the like since the valves can be adjusted without disassembly thereof, the apparatus further resulting in reduced maintenance costs and safer operation of a submarine. The adjustable feature of the valve provides an important safety factor as for example in the case where the discharge valve in a submarine may be stuck in the closed position or the inlet valve with marginal operator torque when opened may not close properly. The valve structure according to the present invention has performed admirably in actual tests wherein no leakage was indicated even at extremely low pressures.

A further important feature of the present invention is the construction of the valve body so as to include land portions in surrounding relationship to the inlet and outlet openings respectively, the seats being slidably positioned on such land portions. The lands slope toward one another or taper in a particular direction to allow ease of adjustment and to control the extent that the bore through the ball valve portion moves off center from the inlet and outlet openings. The slope of the lands is particularly designed so that the tangent of the angle which the lands define with respect to a longitudinal axis extending through the center of the inlet and outlet openings is approximately equal to the average coefficient of friction of the material of the seats so that the force required for adjustment of the ball valve portion and seats will be reduced to practically zero. This is of course a very desirable feature.

A number of different modifications are provided, these modifications differing primarily in the manner in which the ball valve portion is adjusted from an external portion of the valve apparatus. In each case, the ball valve portion may be adjusted without completely disassembling the valve apparatus, it only being necessary to adjust a few external components of the apparatus in order to perform the necessary adjustment of the ball valve structure. The construction of the various adjustment means may be varied in accordance with the accessability of the apparatus to inexperienced personnel or unauthorized persons. In other words, where the apparatus is only available to knowledgeable and well trained personnel, the adjustment means may be of such a nature as to be readily adjusted. On the other hand, where inexperienced or unauthorized persons may have access to the apparatus, the adjustment means may be so constructed as to require special tools or know how in order to adjust the apparatus.

An object of the present invention is to provide new and novel adjustable ball valve apparatus which can be readily adjusted to release the valve when it becomes stuck or seized and further can be adjusted to eliminate leakage in its closed position, which permits the best seating materials now available to be used.

Another object of the invention is the provision of adjustable ball valve apparatus which reduces the necessity for close tolerance machining in order to provide an effective seal and service, especially at low pressures, and which also compensates for small distortions which may be caused by welding the valve means in place.

A further object of the invention is to provide adjustable ball valve apparatus which eliminates the necessity of providing non-standard parts and costly replacements.

Yet another object of the invention is the provision of adjustable ball valve apparatus wherein the ball valve structure and the seats can be machined down if scored or corroded and replaced to still provide an effective seal.

Still another object of the invention is to provide adjustment ball valve apparatus which can be externally adjusted without closing down the associated pressure system thereby substantially reducing the costs involved in maintaining the system.

Still another object of the invention is to provide adjustable ball valve apparatus which is particularly designed to allow easy adjustment of the apparatus at any pressure.

A still further object of the invention is the provision of adjustable ball valve apparatus which is quite simple and inexpensive in construction, and yet is sturdy and reliable in operation.

Other objects and many attendant advantages of the invention will become more apparent when considered in connection with the specification and accompanying drawings, wherein:

FIG. 1 is a view partly in section of a first modification of the present invention;

FIG. 2 is a longitudinal sectional view taken substantially along line 2—2 of FIG. 1 looking in the direction of the arrows;

FIG. 3 is a sectional view taken substantially along line 3—3 of FIG. 2 looking in the direction of the arows;

FIG. 4 is an exploded perspective view of the valve apparatus shown in FIGS. 1–3 inclusive;

FIG. 9 is a view partly in section illustrating a still further modified form of the invention;

FIG. 10 is a sectional view taken substantially along line 10—10 of FIG. 9 looking in the direction of the arrows;

FIG. 11 is an exploded perspective view of the valve structure shown in FIGS. 9 and 10;

FIG. 12 is a view partly in section through a further modified form of the invention;

FIG. 13 is a sectional view taken substantially along line 13—13 of FIG. 12 looking in the direction of the arrows;

FIG. 14 is an exploded perspective view of the valve structure shown in FIGS. 12 and 13;

FIG. 15 is a view partly in section through a further modified form of the invention;

FIG. 16 is a sectional view taken substantially along line 16—16 of FIG. 15 looking in the direction of the arrows; and FIG. 17 is an exploded perspective view of the valve structure illustrated in FIGS. 15 and 16.

Figure 5:
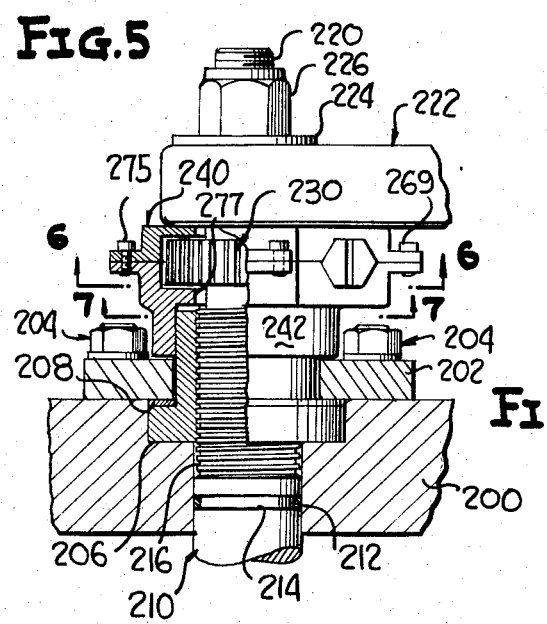
FIG. 5 is a view partly in section illustrating a modified form of the invention.

Referring now to the drawings wherein like reference characters designate corresponding parts throughout the several views, there is shown in FIGS. 1 through 4 inclusive a first modification of the invention including a valve body indicated generally by the reference numeral 20. Valve body 20 includes an enlarged central portion 22 as seen most clearly in FIG. 2, this enlarged central portion including an outwardly extending annular flange portion 24 open at the outer end thereof to define an axis opening. This axis opening is normally closed by a bonnet portion 26 which is held in place by means of nut and stud assemblies 28, the studs extending through holes 25 formed in the bonnet portion 26, the studs being threaded into tapped holes 27 provided in annular portion 24.

As seen most clearly in FIG. 3, the nut and stud assemblies 28 may be ten in number, and the bonnet member is accurately located with respect to portion 24 by means of a dowel 30 which extends through an opening 29 in bonnet portion 26 and is threaded into a correspondingly threaded opening 31 provided in portion 24.

A conventional O-ring 32 is disposed in a circumferentially extending groove 34 formed in the outer surface of the lower reduced portion 35 of the bonnet portion which fits snugly within portion 24 of the valve body. The O-ring serves to provide a fluid seal, the O-ring and the outer surface of the lower portion 35 having a sliding fit with the inner surface 36 of portion 24 as seen in FIG. 2.

The fluid flow through the apparatus of the present invention may be in either direction, but for the purpose of illustration, it will be assumed that the flow is in the direction of the arrow F as indicated in FIG. 2. If the flow is in this direction, portion 40 may be defined as an inlet portion of the valve body including an end portion 42 adapted to be operatively connected with a suitable conduit. An inlet opening 44 is defined in the valve body, this inlet opening being substantially surrounded by a flat planar land portion 46.

The portion 50 of the valve body may be considered the outlet portion terminating in an end portion 52 which is adapted to be operatively connected with a suitable conduit. An outlet opening 54 is substantially surrounded by a flat planar land portion 56. It will be noted that these planar land portions are tapered in a downward direction as seen in FIG. 2, or in other words, the land portions taper toward one another in a direction away from the access opening defined by portion 24 of the valve body. The slope or a degree of taper of these land portions is designated to allow ease of adjustment and to control the extent that the bore through the ball valve portion moves off center from the inlet and outlet openings. The slope is especially designed so that the tangent of the angle which this land portion forms with an axis extending through the center of the inlet and outlet openings is approximately equal to the average coefficient of friction of the material of the seats hereinafter described so that the force required for adjusting the ball and seats upwardly is reduced practically to zero. As illustrated, this angle is approximately 12 degrees for a popular nylon material and is indicated by the letter $a$.

A pair of seats are indicated generally by reference numeral 60 and 62, seats 60 being slidably positioned upon land portion 46, and seat 62 being slidably positioned on land portion 56. Seat 60 includes an inner portion 64 formed of nylon and the like which is surrounded by a relatively rigid annular band of material 66 formed of a metallic substance. The surrounding rigid portion 66 is provided for maintaining the desired shape and configuration of the relatively resilient portion 64. In a similar manner, the seat 62 includes an inner relatively flexible portion 68 and an outer relatively rigid portion 70.

Nylon is a very good sealing substance, although it may be subject to swelling, but this can be readily compensated for with the arrangement of the present invention. As mentioned previously, the slope of the land portions is directly related to the coefficient of friction of the seat material so as to reduce the amount of force required for adjusting the apparatus. It will of course be evident that materials other than lylon may be employed for this purpose as desired.

As seen particularly in FIG. 1, the central portion of the valve body is provided with a rib portion 72 extending across the valve body (this rib portion prevents the ball from traveling far enough to strike the bottom of inlet portion 44 or outlet portion 54) and a pair of guide portion 74 and 76 are formed integral with the valve body and are disposed in such a position as to cooperate with the outwardly facing surface of seat 60 so as to guide the seat in its movement with respect to the associated land portion. As seen in FIG. 3, a corresponding pair of guide portions 78 and 80 may also be formed integral with the valve body and are disposed in such a position as to guide the movement of the seat 62 in its motion relative to the associated land portion.

The ball valve portion is indicated generally by reference numeral 82 and includes an outer surface which defines a portion of a spherical surface. A cylindrical bore 84 is formed through ball valve portion 82, and as seen in FIG. 2, in the open position of the valve the bore 84 is aligned with the inlet and outlet openings 44 and 54 respectively of the valve apparatus. The point $x$ represents the center of the spherical surface portion formed on the outer surface of the ball valve portion, while the point y represents a point along the longitudinal axis z—z extending through the central portions of the inlet and outlet openings. It will of course be noted that the center of the spherical surface of the ball valve portion is spaced above point y as seen in FIG. 2.

The ball valve portion 82 is provided with two upstanding spaced lug portions 86 and 88 defining a space therebetween for receiving the lower end of a valve stem, a groove 90 being formed completely across the ball valve portion and beneath the lug portions 86 and 88, groove 90 being adapted to receive the lowermost end portion of the valve stem as hereinafter described.

As seen most clearly in FIG. 2, bonnet portion 26 is provided with a first cylindrical hole portion 92 formed through the central part thereof which is in communication with a counterbored portion 94, these two hole portions being adapted to receive components of the apparatus as hereinafter described. A first component indicated generally by reference numeral 96 comprises a valve stem which extends through the central hole in the bonnet portion and which includes slot portions 98 in opposite sides thereof which receive the two lug portions 96 and 98 of the ball valve portion, while the lowermost end portion 100 of the valve stem is received within the groove 90 provided in the ball valve portion. With this interconnection, the ball valve portion is fixed to the lower end of the valve stem so as to be readily assembled with respect thereto and yet when in operative position being so connected as to turn with the valve stem and to move upwardly and downwardly along with the valve steam as seen in FIG. 2.

As seen particularly in FIG. 2, the lower portion of valve stem 96 includes a peripherally extending groove 104 within which is seated an O-ring 106 which has sliding engagement with the hole portion 92 and the bonnet portion 26 and which provides a fluid tight seal therewith.

As seen particularly in FIG. 4, the valve stem includes an intermediate threaded portion 110 which joins with a portion having opposite flats 112 formed at diametrically opposite portions thereof, and the uppermost end portion of the valve stem is threaded as indicated by reference numeral 114.

An adjusting nut means is indicated generally by reference numeral 120 having a threaded bore 122 formed longitudinally therethrough, the intermediate threaded portion 110 of the valve stem being threaded within this internally threaded bore. Adjusting nut means 120 includes an outwardly extending annular flange 124 at the lower end thereof which is seated within the hole portion 94 of the bonnet portion. The adjusting nut means includes an intermediate substantially cylindrical portion 126 which joins with an upper portion 128 of generally hexagonal shape for receiving a wrench or the like when adjustments are to be made in the apparatus. The upper end of the adjusting nut means is castellated as indicated by reference numeral 130 for a purpose hereinafter described.

Adjusting nut means 120 is retained in operative position as seen most clearly in FIG. 2 by means of a thrust plate 132 of annular configuration which is held in place by means of stud and nut assemblies indicated generally by reference numerals 134, the nuts extending through suitable openings 136 provided in the thrust plate, the studs being threaded into suitable threaded holes 138 provided in the bonnet portion 26. A thrust bearing 140 is interposed between the upper surface of the flange portion 124 of the adjusting nut means and the undersurface of the thrust plate 132.

An operating means or handle 142 is provided with a hole 144 through one end portion thereof, this hole having flat sides adapted to snugly engage the flat portions 112 on the valve stem so as to lock the operating means and the valve stem together for rotation in unison. The handle portion is maintained in its operative assembled relationship as seen in FIG. 2 by means of a washer 146 and a nut 148 threaded on the upper end of the valve stem.

The undersurface of the operating means is provided with a castellated portion 150 disposed in surrounding relationship to the hole 144 formed through the operating means. This castellated portion 150 is adapted to engage the castellated portion at the upper end of the adjusting nut means as seen in FIG. 2 so as to lock the adjusting nut means to the operating means for rotation therewith whereby the operating means, the adjusting nut means and the valve stem will ordinarily rotate in unison with one another.

The operating handle 142 is provided with an elongated recess 152 in the upper surface thereof, an operating lever 154 being disposed within the recess and pivotally supported by a pin member 156 extending through the lever and supported in the handle. A leaf spring 158 has one end thereof disposed within a small groove 160 provided in the undersurface of the lever, leaf spring 158 normally urging the end portion of the lever in an upward direction as seen in FIG. 2.

The opposite end portion 162 of the lever 154 is bifurcated and a downwardly extending substantially cylindrical latch member 164 is pivotally supported about a pin 166 supported between the bifurcated ends of end portion 162. It is apparent that the leaf spring 158 will normally urge the end 162 of the lever in a downward direction so as to move latch member 164 into its latching position. The latch member 164 is disposed within a suitable bore provided in a downwardly projecting portion 168 of the operating handle, this downwardly projecting portion being cut away as indicated at 170 to provide a recess at the lower end thereof, the lower end of latch member 164 extending downwardly into this cutout portion.

A pair of stop members indicated generally by reference numerals 174 and 180 as seen in FIG. 4, are suitably secured as by welding or the like to the top surface of the bonnet portion 26. Stop member 174 includes a lateral surface 175 for limiting movement of the operating handle, and a recess portion 177 is adapted to receive the latch member 164 for locking the valve in its closed position. The stop member 180 is provided with a lateral surface 182 adapted to limit the movement of the operating handle in the opposite direction while a recess portion 184 is provided for receiving the latch member 164 to thereby lock the valve in its open position.

It is apparent that when it is desired to move the valve from its open position to its closed position or vice versa, it is merely necessary to depress the lever member 154 against the force of the leaf spring 158 whereupon the latch member 164 wil be drawn upwardly out of the recess in the associated stop member. The operating handle can then be rotated until it strikes the other stop member whereupon lever 154 can be released such that the latch member 164 will drop into the recess in the associated stop member to lock the operating handle in this position.

If during system operation the ball valve portion has become seized or stuck for some reason, nut 148 can be backed off and the operating handle 142 lifted so that the castellated portion 150 thereof is out of engagement with the castellated portion 130 on the adjusting nut means. A wrench or the like can then be applied to the hexagonally shaped portion 128 of the adjusting nut means so as to move the adjusting nut means in a suitable direction such that relative rotation between the adjusting nut means and the associated valve stem will cause the valve stem and the associated ball valve portion to be raised as seen in FIG. 2, or in other words, moved away from the portion 72 of the valve body. Such movement of the ball valve portion will move the seats so as to release or lower the pressure thereon. When the compressive forces on the ball valve portion and the seats are reduced in this manner, the valve will be unstuck and can be readily moved.

It will of course be understood that the seats are retained in their proper shape by the rigid annular portions 66 and 70 previously described.

On the other hand, if the valve should be leaking during operation, a similar adjustment may be made wherein the adjusting nut means is rotated in the opposite direction with respect to the valve stem so as to cause the ball valve portion and the seats as seen in FIG. 2 to be moved downwardly toward the portion 72 of the valve body. This movement of the ball valve portion and the seats causes the ball valve portion to squeeze tighter against the seats thereby increasing the pressure of the seats against the ball valve portion thus producing a tight seal which prevents the valve from leaking.

An arrangement may be made between threads-per-inch on the adjusting nut and the number of castellations on the adjusting nut so that each castellation rotation of the adjusting nut will result in .001 inch movement of the seats in a direction perpendicular to the seat lands 46 and 56. This will permit controlled adjustment of the valve.

When the necessary adjustment has been made, the operating handle means can then be lowered back into the position shown in FIG. 2 wherein the castellations on the operating handle will engage the castellations on the adjusting nut means, and no further relative movement can occur between the adjusting nut means and the valve stem during operation of the apparatus.

Referring now particularly to FIGS. 5 through 8 inclusive of the drawings, a first modification is illustrated wherein the valve body means and the ball valve portion as well as the seats are of identical construction with the modification illustrated in FIGS. 1 through 4, and the adjusting means of the modification shown in FIGS. 5 through 8 has been modified.

A bonnet portion 200 corresponds to the bonnet portion 26 previously described, and the thrust plate 202 is similar to thrust plate 132, thrust plate 202 being held in place by means of stud and nut assemblies 204 similar to the assemblies 134 previously discussed. An adjusting nut means 206 is provided which is identical with the adjusting nut means 120 of the previous modification with the exception that the upper end of adjusting nut means 206 is not castellated but may simply be a flat surface. A thrust bearing 208 is provided, this bearing being identical with the bearing 140 previously described.

The valve stem of this modification is indicated generally by reference numeral 210, an O-ring 212 being disposed within an annular groove 214 provided in the outer surface of the valve stem, this O-ring providing a fluid tight seal with the associated counterbored hole provided in the bonnet portion. The valve stem is provided with an intermediate threaded portion 216 which joins with an elongated portion having flats 218 at diametrically opposite sides thereof. The uppermost end of the valve stem is threaded as indicated at 220. A handle or operating means 222 is provided which may be substantially identical with the means 142 previously described, this handle having an opening therein with flats at opposite sides thereof so as to be snugly received on the flats 218a on the valve stem whereby the handle and the valve stem are constrained for rotation with one another. The handle 222 is retained in its operative position by means of a washer 224 and a nut 226 threaded on the upper threaded end portion 220 of the valve stem.

The adjusting means includes a gear wheel 230 having an opening 232 formed through the central portion thereof having flats at opposite sides thereof for snugly receiving the elongated portion of the valve stem having the flats 218 thereon such that gear wheel 230 is constrained for rotation with the valve stem but may slide axially relative thereto. Gear wheel 230 meshes with a worm gear 234 which has reduced journalled portion 235 extending from opposite ends thereof which in turn terminate in enlarged head portions 236 having a slot 238 formed therein for receiving a screw driver or other means for turning the worm gear when adjustments are to be made.

Figure 8:
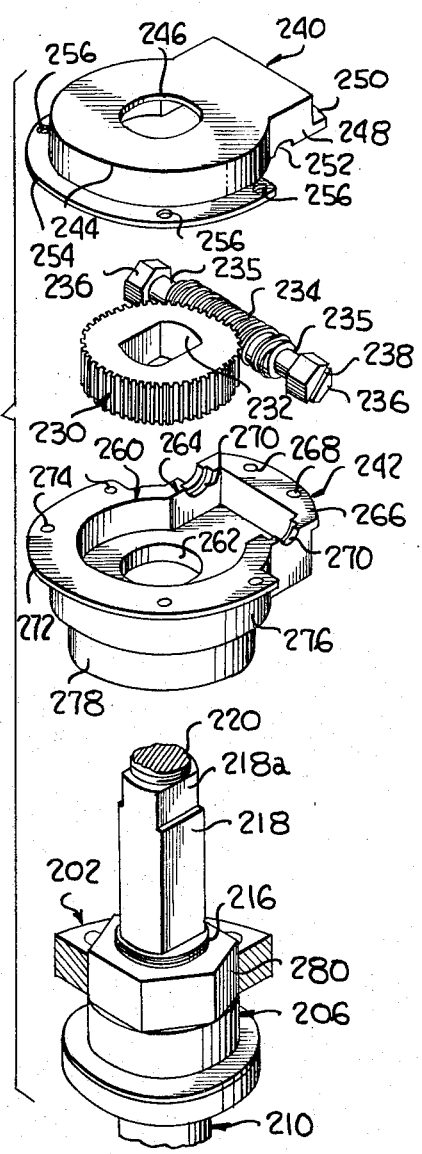
FIG. 8 is an exploded perspective view of the valve structure shown in FIGS. 5 through 7 inclusive.
Figure 6:
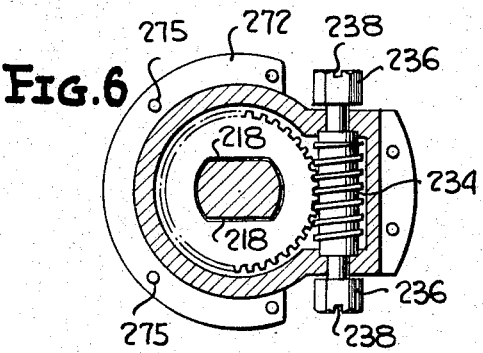
FIG. 6 is a sectional view taken substantially along line 6—6 of FIG. 5 looking in the direction of the arrows.

The worm gear is supported within a housing means including an upper portion 240 and a lower portion 242. The upper housing portion 240 includes an inverted cup-shaped portion 244 having a central opening 246 formed therethrough for receiving the valve stem, and a laterally extending offset portion 248 also opens in a downward direction. A flange portion 250 extends laterally from portion 248 and is provided with a pair of holes formed therethrough which are not visible in FIG. 8 and which receive screws for holding the two portions of the housing together. A pair of substantially semi-circular recesses 252, one of which is visible in FIG. 8, are provided at opposite portions of the offset portion 248 for receiving the journalled portions 235 of the worm gear. An arcuate flange portion 254 extends outwardly from the lower wall portion of portion 244, this latter flange portion being provided with four spaced openings 256 three of which are visible in FIG. 8 which receive additional screws for holding the two halves of the housing together.

The lower body portion 242 includes a cup-shaped portion 260 which cooperates with the inverted cup-shaped portion 244 for receiving the gear wheel 230 therewithin. A central hole 262 is provided through the bottom wall of the cup-shaped portion 260 for receiving the valve stem. An offset portion 264 extends laterally of the cup-shaped portion 260 and opens in an upwardly direction to cooperate with the downwardly opening portion 248 previously described for receiving the worm gear.

A laterally extending flange portion 266 extends outwardly from the offset portion 264 and is provided with a pair of holes 268 which may be threaded for receiving a pair of screws 269 extending through the aligned openings in flanges 250 and 266 for retaining the two housing portions in assembled relationship.

A pair of substantially semi-circular recess portions 270 are provided in the opposite walls of the offset portion 264 and cooperate with the recess portions 252 of the upper housing portion for supporting the journalled portions 235 of the worm gear such that the worm gear may be rotated by inserting a screw driver or the like in either enlarged head 236 provided at the opposite ends thereof. The gear wheel 230 and the worm gear are provided with a pitch which results in a self-locking action under normal circumstances.

Portion 260 is provided with an arcuate flange portion 272 extending outwardly from the upper wall portion thereof, this flange portion being provided with a plurality of threaded holes 274 which may be four in number and which are adapted to receive screws 275 which extend downwardly through the aligned holes in the flanges 254 and 272 for securing the two halves of the housing in operative relationship.

Figure 7:
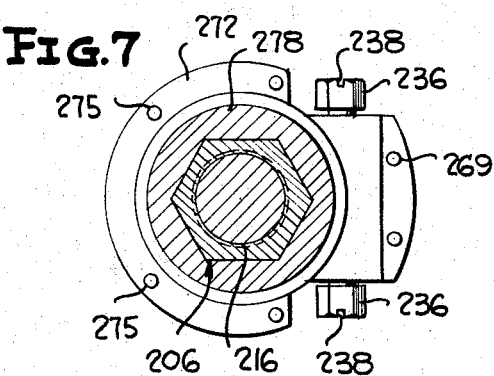
FIG. 7 is a sectional view taken substantially along line 7—7 of FIG. 5 looking in the direction of the arrows.

The portion 260 includes a downwardly extending portion 276 which joins with a reduced downwardly extending portion 278 the inner surface of which is hexagonal in shape as seen particularly in FIG. 7 and which snugly receives the hexagonal upper portion 280 of the adjusting nut 206 as seen in FIG. 8.

With the arrangement as shown in FIGS. 5 through 8 inclusive, it will be apparent that the handle 222 is keyed to the valve stem for rotation therewith as is the gear wheel 230. As mentioned, the worm gear 234 is provided with such a pitch as to be normally self-locking with respect to the gear wheel, and accordingly rotation of the gear wheel along with the valve stem will ordinarily carry the worm gear and the associated halves of the housing 240 and 242 along therewith. Accordingly, the housing means will rotate with the gear wheel and the worm gear, and since the lower portion 278 of the housing is connected with the upper end of the adjusting nut means for rotation therewith but is slidable axially thereto, the adjusting nut means 206 will also be constrained to rotate with the valve stem.

Accordingly, during normal operation of the apparatus, there can be no relative rotation between the valve stem and the adjusting nut means. When it is desired to make a suitable adjustment, the valve stem can be held in position by means of the handle, and a screw driver of the like applied to the worm gear to rotate the worm gear with respect to the gear wheel 230. Since the gear wheel is held stationary along with the valve stem, the worm gear along with the associated housing means and the adjusting nut means will rotate with respect to the valve stem thereby producing the desired adjustment.

Referring now particularly to FIGS. 9 through 11 inclusive, a modified form of the invention is illustrated wherein the bonnet portion 290 is identical with the bonnet portion 26 previously described, and a thrust plate 292 similar to the thrust plate 132 is held in place by means of stud and nut assemblies 294, it being understood that the remaining valve body means as well as the ball valve portion and the seats are identical with that described in connection with the first modification of the invention.

An adjusting nut means 296 is provided, this adjusting nut means being provided with castellations 298 at the upper end thereof, and a thrust bearing 300 is provided between the adjusting nut means and the thrust plate 292 as seen in FIG. 9.

The valve stem of this modification is indicated generally by reference numeral 302, this valve stem being substantially identical with the valve stem 210 described in connection with the second modification of the invention. Valve stem 302 has a peripherally extending groove 303 formed in the outer surface thereof which receives an O-ring 305 to provide a fluid tight seal with the hole through bonnet portion 290. An intermediate portion 304 of the valve stem is threaded within the internal bore formed through the adjusting nut means as in the previous modifications. This threaded portion in turn joins with an elongated portion having flats 306 at the diametrically opposite portions thereof, the valve stem terminating in an uppermost threaded portion 308.

A handle or operating member 310 is substantially identical with that illustrated in FIGS. 1 through 4 inclusive and includes a hole 311 having flats disposed at the opposite sides thereof which are adapted to engage the flats 306a on the valve stem to cause the handle and valve stem to rotate in unison. The handle means is retained on the valve stem by means of a washer and nut 314 which is threaded on the upper end 308 of the valve stem.

A movable member 316 is provided, this member having a central opening 318 having flats formed on the opposite sides thereof for engaging the flats 306 on the valve stem such that member 316 is constrained for rotation with the valve stem and at the same time is axially movable relative thereto. A compression spring 322 is disposed between the movable member 316 and the handle 310 for normally urging the movable member 316 in a downward direction as seen in FIG. 9 such that the castellations 320 formed on the lower edge thereof engage the castellations 298 at the upper end of the adjusting nut means 296.

A wrench member is indicated generally by reference numeral 324 and includes an enlarged portion 326 having a hexagonally shaped opening therethrough which is adapted to fit snugly about the hexagonally shaped upper portion 327 of the adjusting nut means. The wrench also includes a laterally extending handle portion 328 which can be manually grasped for turning the wrench and the interconnected adjusting nut means.

It is apparent during normal operation of this form of the invention that movable means 316 rotates with the valve stem and when in its operative position as shown in FIG. 9 will cause the adjusting nut means to rotate therewith such that there can be no relative rotation between the valve stem and the adjusting nut means. The spring 322 normally urges the components into this operative position.

On the other hand, when it is desired to make adjustments in this form of the apparatus, the movable means 316 can be manually grasped and urged upwardly against the force of spring 322 whereupon wrench 324 may be utilized for turning the adjusting nut means while the valve stem is held stationary thereby producing the desired adjustment.

Referring now to the modification shown in FIGS. 12–14 inclusive, a bonnet portion 330 is provided which is identical with the previously discussed bonnet portions, the remaining portions of the valve body and ball valve portion as well as the seats also being identical with all of those previously discussed. A thrust plate 332 similar to thrust plate 132 is provided and held in operative position by means of stud and nut assemblies indicated by rererence numerals 332. Adjusting nut means 336 is identical with the adjusting nut means 120 previously described and is provided with castellations 338 at the upper end thereof. A thrust bearing 340 is provided between the adjusting nut means and the thrust plate 332.

The valve stem is indicated generally by reference numeral 342, and an O-ring 344 is disposed within an annular groove 346 formed in the outer surface of the valve stem for providing a fluid tight seal with the hole through the bonnet portion. The valve stem is threaded throughout the intermediate portion 350 thereof up to a reduced end portion 352 which is also threaded. A first pair of flats 354 are provided at diametrically opposite sides of the valve stem and a second pair of flats 356 are similarly located just above flats 354 and are recessed inwardly a slight amount.

A handle or operating means 358 may be identical with the handle means 142 previously described, the handle means being provided with a hole 359 having flats formed on the opposite sides thereof for engaging the flats 356 on the valve stem whereby the handle is supported on the valve stem and rotatably connected therewith. The handle means is held in operative position by means of a washer 360 and a nut 362 threaded on the upper threaded end portion of the valve stem.

A hand wheel member 364 of generally annular configuration is provided with a central hole 366 which is hexagonal in shape and which snugly fits about the hexagonally shaped portion 368 at the upper end of the adjusting nut means 336. It is apparent that this hand wheel portion may be utiized for turning the adjusting nut means when it is desired to make adjustments in the apparatus.

A movable member 370 is provided with a central hole 372 having flats formed on opposite sides thereof for engaging the flats 354 formed on the valve stem whereby member 370 is constrained for rotation with the valve stem yet may slide axially relative thereto. Member 370 is provided with downwardly facing castellations 374 which are adapted to cooperate with the castellations 338 formed on the adjusting nut means.

A lock member 376 of generally annular configuration is provided with a central opening 378 which is threaded and which is adapted to be threaded on the portion 350 of the valve stem. Member 376 includes a laterally extending portion 380 which can be either manually grasped or engaged by a suitable tool for tightening and loosening the locking member.

As seen in FIG. 12, the components are illustrated in their normal operative position wherein the handle means rotates with the valve stem, and member 370 which is constrained to rotate with the valve stem is drivingly interconnected with the adjusting nut means 336 so that the adjusting nut means turns with the valve stem and there can be no relative rotation therebetween.

When it is desired to make adjustments of the apparatus, member 376 is loosened and backed off whereupon the movable member 370 can be slid upwardly along the valve stem to disengage the castellations 374 from those on the adjusting nut means. The adjusting nut means can then be turned by grasping the hand wheel 364 and turning it in the desired direction so as to perform the necessary adjustments. After the adjustments have been made, member 370 can then again be lowered so that the castellations 374 thereof engage those on the adjusting nut means, and the locking member 376 can again be threaded downwardly into its locked position as illustrated in FIG. 12.

Referring now to FIGS. 15–17 inclusive, a further modified form of the invention is illustrated wherein the bonnet portion 400 may be substantially identical with the bonnet portion 26 previously described, while the remainder of the valve structure is similar to that of all the previous modifications.

The adjusting means as shown in FIGS. 15–17 includes a thrust plate 402 which is held in operative position on the bonnet portion by means of stud and nut assemblies 404 similar to those previously described. In this modification, the central hole 406 through the thrust plate is threaded, and the thrust plate includes a plurality of holes 408 for receiving the studs for securing the thrust plate in position. The thrust plate also includes an upwardly extending portion 410 which in turn terminates in a laterally outwardly extending portion 412 having a pair of spaced threaded holes 414 and 416 formed therethrough for a purpose hereinafter described.

In this modification, the valve stem 420 is provided with a peripherally extending groove 422 within which an O-ring 424 is disposed for providing a fluid tight seal with the hole and the bonnet portion. The valve stem is provided with an annular radially extending thrust collar 426 at an intermediate portion thereof, this thrust collar supporting an annular bearing 428 which is adapted to engage the lower end of an adjusting nut 430 having threads on the outer surface thereof which engage the internal threads 406 provided within the hole in the thrust plate 402.

The upper end of the adjusting nut 430 is provided with an enlarged radially extending flange 434, and a second annular bearing 436 is disposed between the upper end of the adjusting nut and the undersurface of a handle or operating means 440 which may be substantially identical with the handle means 142 previously described.

Handle 440 is provided with a hole 442 having flats formed on opposite sides thereof which are adapted to engage flats 444 formed on diametrically opposite sides of the valve stem 420 such that the handle and valve stem are constrained for rotation with one another. The handle is held in its operative position as shown in FIG. 15 by means of a washer and nut 448 which is threaded on the upper threaded end 450 of the valve stem.

The locking or latch member 452 is provided, this member having a pair of spaced holes 454 and 456 formed therethrough. A pivot pin 458 which is threaded at the lower end thereof extends downwardly through hole 454 and is threaded within the hole 414 previously described, the pivot pin serving to pivotally support the lever member 452 in operative position.

One end portion of lever 452 is provided with a depending rod-like portion 460 which is adapted to fit within one of the holes 462 provided in the enlarged flange portion 434 on the adjusting nut.

An eye bolt indicated generally by reference numeral 464 includes an eye portion 466 and a depending threaded stud portion 468 which can extend through the hole 456 provided in lever 452 and which is threaded at its lower end into a threaded hole 416 provided in the portion 412 of the thrust plate. A suitable wire or the like 470 may be connected between the eye portion 466 and the end of the lever 452 for preventing the eye bolt from becoming lost when making adjustments.

The valve structure is shown in its normally operative position as illustrated in FIG. 15 wherein the adjusting nut 430 is retained in its adjusted position by means of the lever 452, and the adjusting nut does not turn during normal operation of the valve and turning of the handle and valve stem.

When it is desired to make an adjustment of the apparatus, eye bolt 464 is removed whereupon lever 452 may be swung in either direction as desired. This swinging movement will provide a certain amount of leverage for turning the adjusting nut 430 as required. Various operative positions of the lever 452 are illustrated in phantom lines in FIG. 16 whereby it is apparent that swinging movement of the lever is adapted to turn the adjusting nut in either desired direction. The lever can also be lifted upwardly and out of engagement with the holes 462 in the enlarged flange 434 of the adjusting nut whereupon the portion 460 of the lever can be inserted in another hole of the adjusting nut flange, and acccordingly, any desired amount of movement of the adjusting nut can be obtained. When the adjusting nut has been moved into the desired position, the lever is again locked in its operative position as shown in FIG. 15 whereupon no further movement of the adjusting nut will be possible, and the apparatus will be held in its adjusted position.

It is apparent from the foregoing that there is provided according to the present invention a new and novel adjustable ball valve apparatus which can be readily adjusted to release the valve apparatus when it becomes stuck or seized and which further permits adjustment to eliminate leaking in the closed position. With this arrangement, the best available seating materials can be used since swelling is no longer a major problem with this type of arrangement. The adjustable valve structure of the present invention reduces the necessity for close tolerance machining in order to provide an effective seal while in service, especially at low pressures. This adjustable feature also provides a means for compensating for small distortions which may be caused by welding the valve means in place or for other reasons. In addition, it is not necessary to provide non-standard parts or costly replacements since the structure of the present invention incorporates relatively standard elements.

With the adjustable valve structure of the present invention the ball valve structure as well as the seats can be machined down if they become scored or corroded and will still provide an effective seal. The adjusting means is so arranged that it may be adjusted without disassembling the valve structure, an external member being available at all times for adjustment. Accordingly, it is not necessary to close down the associated pressure system when making adjustments thereby substantially reducing maintenance costs involved with this arrangement. A further advantage of having the adjustment means externally available as in the present invention is the fact that the torque applied to the ball valve structure and the seats in order to provide an effective seal may be measured by applying a torque wrench or other measuring means to the adjusting member. The particular construction of the slope of the land portions in cooperation with the type of seating material allows easy adjustment of the structure at any pressure. In addition, the structure of the present invention is quite simple and inexpensive in construction and yet is quite sturdy and reliable in operation.

As this invention may be embodied in several forms without departing from the spirit or essential characteristics thereof, the present embodiment is therefore illustrative and not restrictive, and since the scope of the invention is defined by the appended claims, all changes that fall within the metes and bounds of the claims or that form their functional as well as conjointly cooperative equivalents are therefore intended to be embraced by those claims.

We claim:

1. Adjustable ball valve apparatus comprising valve body means including an inlet opening and an outlet opening, said inlet and outlet openings being spaced from one another and substantially aligned with one another, said valve body means also including an access opening, a bonnet portion closing said access opening and defining a hole therethrough, said valve body means including land portions each of which is disposed in surrounding relationship to one of said openings, a pair of annular seats, each of said seats being slidably disposed on one of said land portions with the seats disposed at substantially surrounding relation to said openings, a ball valve portion disposed within said valve body means and including an outer surface defining a portion of a spherical surface and adapted to sealingly engage said seats, a valve stem having one end portion thereof operatively connected with said ball valve portion for turning the ball valve portion and for moving the ball valve portion laterally within the valve body means, said valve stem extending through the hole in said bonnet portion and including a valve stem portion extending outwardly of said valve body means and said bonnet portion, said valve stem including an intermediate threaded portion, and adjusting nut means supported by said bonnet portion and having an internally threaded bore formed therethrough, said intermediate threaded portion of the valve stem being threaded within said bore of the adjusting nut means, operating means interconnected with the outwardly extending portion of said valve stem and being fixed for rotation with the valve stem, and means for interconnecting said operating means with said adjusting nut means to cause the adjusting nut means to turn with said operating means so that the operating means, the valve stem and the nut means will rotate as a unit.

2. Apparatus as defined in claim 1 wherein said adjusting nut means is retained in operative position by means of a substantially annular thrust plate secured to said bonnet portion, said adjusting nut means including an outwardly extending flange portion at one end thereof which cooperates with said thrust plate for holding the adjusting nut means in position.

3. Apparatus as defined in claim 1 wherein the means for interconnecting said operating means with said adjusting nut means comprises cooperating positively interlocking portions, said operating means being movable in a direction away from said adjusting nut means so as to disengage the operating means from said adjusting nut means to permit the adjusting nut means to be rotated relative to said valve stem to move the valve stem either inwardly or outwardly of said valve body means to thereby change the pressure of the ball valve portion against said seats.

4. Apparatus as defined in claim 3 including latch means connected with said operating means for latching and holding the operating means in either its open position or its closed position.

5. Adjustable ball valve apparatus comprising valve body means including an inlet opening and an outlet opening, said inlet and outlet openings being spaced from one another and substantially aligned with one another, said valve body means also including an access opening, a bonnet portion closing said access opening and defining a hole therethrough, said valve body means including land portions each of which is disposed in surrounding relationship to one of said openings, a pair of annular seats, each of said seats being slidably disposed on one of said land portions with the seats disposed at substantially surrounding relation to said openings, a ball valve portion disposed within said valve body means and including an outer surface defining a portion of a spherical surface and adapted to sealingly engage said seats, a valve stem having one end portion thereof directly and positively connected with said ball valve portion for turning the ball valve portion and for moving the ball valve portion laterally within the valve body means, said valve stem extending through the hole in said bonnet portion and including a valve stem portion extending outwardly of said valve body means and said bonnet portion, said valve stem including an intermediate threaded portion, an adjusting nut means supported by said bonnet portion and being axially fixed with respect thereto and having an internally threaded bore formed therethrough, said adjusting nut means being mounted for rotation with respect to said bonnet portion, said intermediate threaded portion of the valve stem being threaded within said bore of the adjusting nut means, said adjusting nut means including a portion extending outwardly of said bonnet portion and being engageable for rotating said adjusting nut means with respect to said bonnet portion, operating means interconnected with the outwardly extending portion of said valve stem, and means for selectively permitting rotation of said valve stem with respect to said adjusting nut means in opposite directions for causing axial movement of said valve stem and the ball valve portion interconnected therewith in opposite directions with respect to the adjusting nut means and to alternatively selectively connect the valve stem with said adjusting nut means to turn with the adjusting nut means thereby preventing relative rotation between the valve stem and the adjusting nut means so as to prevent axial movement of the valve stem with respect to the adjusting nut means.

6. Apparatus as defined in claim 5 wherein said valve stem includes a non-circular portion adjacent said intermediate threaded portion, a gear wheel disposed on said non-circular portion and being mounted for rotation with said non-circular portion and being slidable longitudinally of said non-circular portion, a housing disposed in surrounding relationship to said gear wheel, a worm gear interconnected with said housing and engaging said worm wheel, said housing being connected with said portion of the adjusting nut means extending outwardly of said bonnet portion so that said worm gear may be turned to cause the housing and the interconnected adjusting nut means to rotate with respect to the gear wheel which is fixed for rotation with the valve stem.

7. Apparatus as defined in claim 6 wherein the outermost end of the outwardly extending portion of the valve stem is threaded, and nut means threaded on said outermost end of the valve stem to retain the operating means and said housing in operative position, said adjusting nut means being maintained in position by a thrust plate connected with said bonnet portion.

8. Apparatus as defined in claim 5 wherein said valve stem includes a non-circular portion extending outwardly from the intermediate threaded portion thereof, movable means slidably positioned on said non-circular portion of the valve stem and constrained for rotation therewith, resilient means normally urging said movable means toward the portion of the adjusting nut means extending outwardly of said bonnet portion, said portion of the adjusting nut means extending outwardly of said bonnet portion and said movable means including interengaging portions for locking the movable means and the adjusting nut means together for rotation with one another.

9. Apparatus as defined in claim 8 wherein said portion of the adjusting nut means extending outwardly of said bonnet portion includes flat portions formed on the outer surface thereof, and wrench means engaged with said flat portions for adjusting the adjusting nut means.

10. Apparatus as defined in claim 5 including movable means disposed in surrounding relationship to said valve stem, said valve stem having a first flat portion formed on the outer surface thereof, said movable means having a corresponding flat portion for engaging said first flat portion such that said movable means is constrained for rotation with said valve stem but is slidable axially thereof, said movable means and said adjusting nut portion extending outwardly of said bonnet portion including interengageable means for causing the movable means and the adjusting nut means to rotate in unison, and locking means threaded in surrounding relationship to said threaded portion of the valve stem and engaging said movable means for locking said movable means in an operative adjusted position.

11. Apparatus as defined in claim 10 wherein said adjusting nut means includes flat portions formed on the outer surface of the portion thereof extending outwardly of said bonnet portion, and manually operable means disposed in surrounding relationship to said last-mentioned flat portions and including further flat portions engageable with said flat portions on the adjusting nut means portion extending outwardly of said bonnet portion for turning said adjusting nut means to control the adjustment of the apparatus.

References Cited
UNITED STATES PATENTS

| | | | |
|---|---|---|---|
| 574,571 | 1/1897 | Pollock | 251—161 |
| 1,941,839 | 1/1934 | Johansson | 251—170 |
| 3,016,226 | 1/1962 | Freeman | 251—109 |
| 3,107,080 | 10/1963 | Priese | 251—171 |
| 3,132,836 | 5/1964 | Dickerson | 137—454.6 X |
| 3,173,648 | 3/1965 | McGuire | 251—315 X |
| 3,179,121 | 4/1965 | Bredtschneider | 251—170 |

HAROLD WEAKLEY, *Primary Examiner.*

WILLIAM F. O'DEA, *Assistant Examiner.*